E. H. MOYLE.
STAMP MILL.
APPLICATION FILED MAY 16, 1905.
1,181,535.
Patented May 2, 1916.
2 SHEETS—SHEET 1.
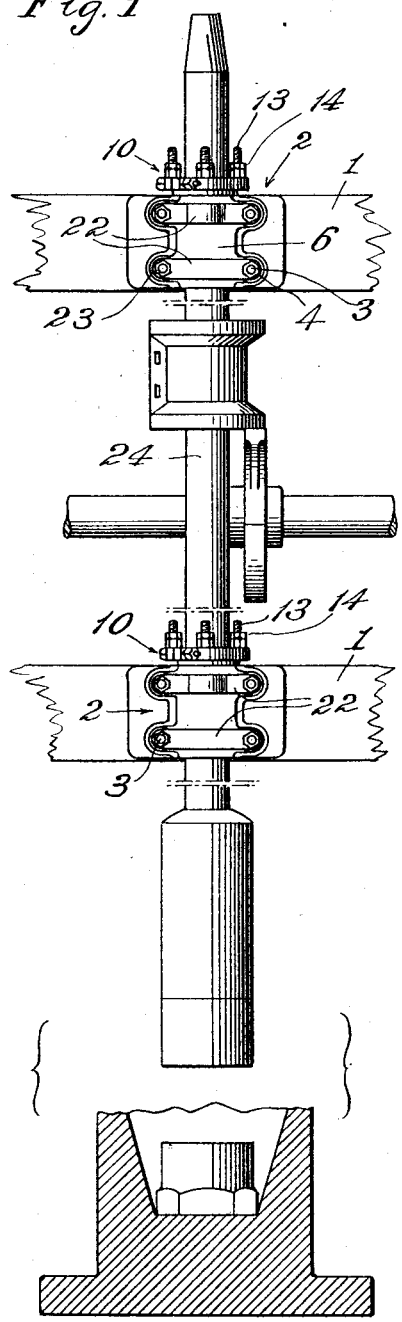
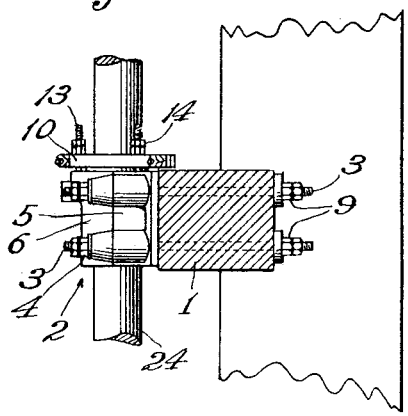
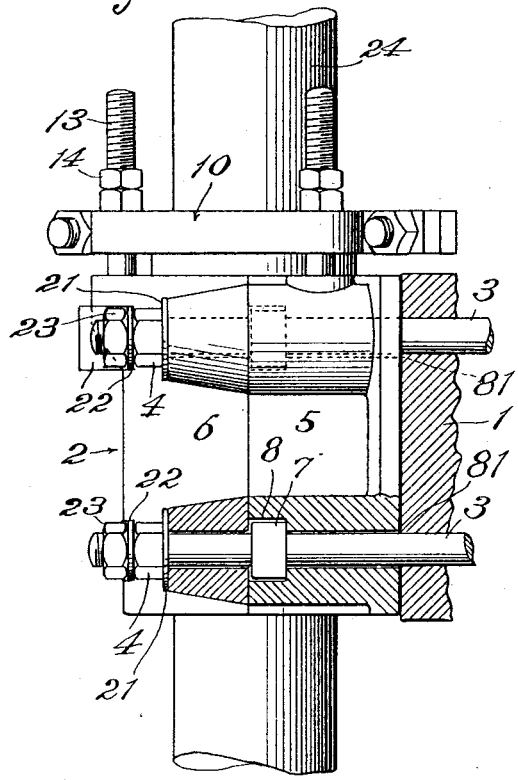
Witnesses:
C. C. Holly
J. Townsend
Inventor:
Edward H. Moyle
by Townsend Bros
his Attys

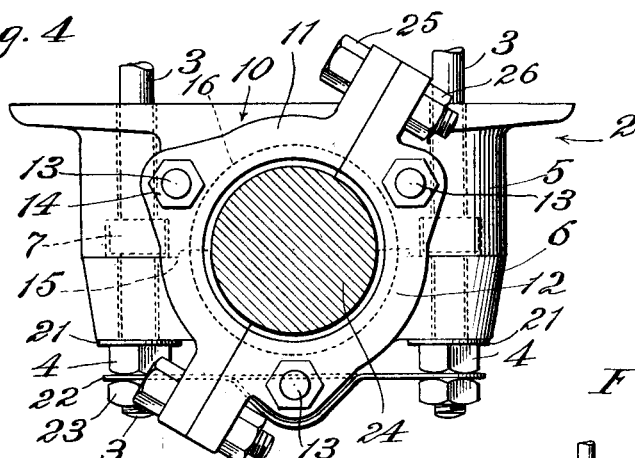
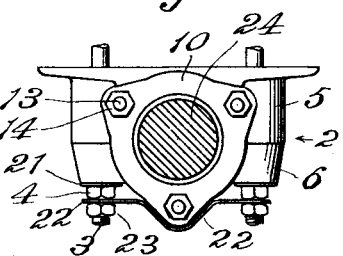
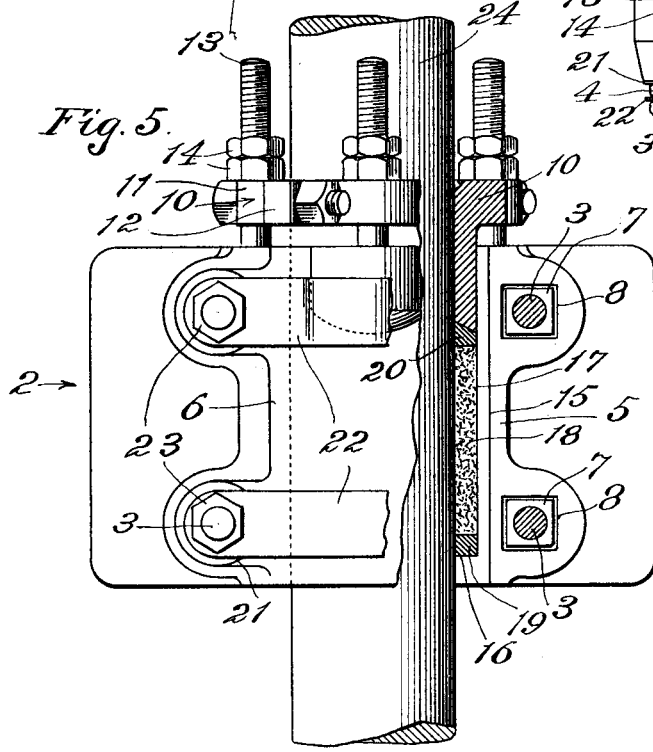

UNITED STATES PATENT OFFICE.

EDWARD H. MOYLE, OF LOS ANGELES, CALIFORNIA.

STAMP-MILL.

1,181,535.  Specification of Letters Patent.  Patented May 2, 1916.

Application filed May 16, 1905. Serial No. 260,608.

*To all whom it may concern:*

Be it known that I, EDWARD H. MOYLE, a citizen of the United States, residing at Los Angeles, in the county of Los Angeles, State of California, have invented a new and useful Improvement in Stamp-Mills, of which the following is a specification.

An object of this invention is to provide convenient or satisfactory means for quickly taking up the lost motion and for lubricating the stem with a dry or plastic packing.

Another object of the invention is to provide a practically indestructible guide for the stems of stamp mills.

Another object of the invention is to produce a guide which will allow the removal of the stem, for repairs or other purposes, in a most convenient and rapid manner and allow the resetting of the same in true alinement with the least labor and loss of time.

Another object is to make provision for conveniently re-using the lubricating take-up packing from time to time.

My invention comprises a separable stuffing box, having parts easily removable, constructed to serve as a guide for the stamp-stem.

The accompanying drawings illustrate the invention.

Figure 1 is a fragmental view showing a stamp mill embodying this invention. Fig. 2 is a fragmental detail at right angles to Fig. 1 showing one of the guides. Fig. 3 is a side elevation in partial section of one of the guides constructed in accordance with this invention. Fig. 4 is a plan of said guide, the stamp being shown in section. Fig. 5 is a front elevation in partial section of the said guide. Fig. 6 is a view showing the guide constructed with a solid gland. In each of the views the stamp stem is shown.

1 is the timber guide girt of the stamp mill to which girt the stem guide 2 is fastened by bolts 3 and nuts 4. The guide comprises a box constructed in two sections, 5 and 6. The section 5 is fastened to the timber guide girt 1 by shoulders 7 on the bolts 3 and seated in sockets 8 in section 5. In such case, the bolts 3 may be screw-threaded at both ends and fastened to the timber guide girt 1 by nuts 9.

10 is a stuffing box or gland. Said gland may be made in sections 11, 12, as shown in Fig. 4, or may be made in a solid ring as shown in Fig. 6. The gland 10 is drawn down on the dry plastic packing by bolts 13 and nuts 14; the bolts 13 being screwed into sections 5 and 6 of the box and the nuts 14 screwed down on the gland. Preferably the box sections 5 and 6 are interlocked by offsets as indicated at 15.

16 designates internal annular shoulders on sections 5 and 6, at one end of the bore of the box to form the bottom of an annular receptacle 17 between said shoulder and gland 10 to contain a dry and plastic packing 18.

19 and 20 designate rings of Tuck's packing or some other flexible material to tightly close the ends of the chamber or receptacle 17 to prevent the escape of the lubricating material 18. The packing rings or washers 19 and 20 are designed primarily to act as wipers for the stem, and to collect and keep confined the triturated plastic packing interposed between the washers which in the movement of the stem has a tendency to disintegrate packing 18. Furthermore, the elasticity of these washers allows of the more steady compression of the plastic packing 18, and is efficient in preventing the vibration and jar incident to the reciprocation of the stem within the sections, however other resilient means may be used, such as a spring and wiper plate of soft metal.

In practical use, the section 5 of the box will first be fastened in place on the timber guide girt 1, and then the gland 10 will be placed on the stamp stem 24; then the stamp stem will be brought into place in the bore of section 5, the gland being on the stem above said section. The section 6 will be brought into place and fastened by nuts 4. Preferably cut washers 21 will be interposed between the section 6 and the said nuts. Then the Tuck's packing 19 will be inserted around the stem 24 and placed in position on the shoulder 16 at the bottom of chamber 17, then the dry or plastic lubricating packing 18 will be placed in the chamber 17, preferably in loose form until the chamber 17 is filled nearly to the top so as to allow for compressing into form; then the top ring 20 of Tuck's packing or like material, will be inserted at the top of the chamber 17 and the gland 10 screwed down until further adjustment is unnecessary. Preferably yokes 22 arranged to prevent said bolts 4 from working loose are provided, and are placed over the ends of the bolts 3 and secured in place by nuts 23. When it is desired to remove the stem, the section 6 and gland 10 will be loosened and removed from the section 5, whereupon the stem will be removed and the lubricating packing picked out and preserved for subsequent use. By thus providing two chambered sections, one of which is provided with the socketed bolt holes 8 and fastened to a support by the shouldered bolts 3 by which the other chambered section 6 is detachably held in place, the outer section 6 is readily detachable whenever the gland has been lifted free from the bolts 13. The sections 11 and 12 of the separable gland are preferably held together by bolts and nuts 25, 26, so that by simply removing the nuts from the bolts of the box and the gland, the stamp stem may be freed, removed and replaced.

From the foregoing it is clear that I have provided a guide for a stamp stem capable of holding plastic packing and means to resiliently compress the plastic packing so as to produce steady compression of the packing and minimize vibration and jar.

What I claim is:—

1. A guide for a stamp mill stem comprising separable semicylindrical sections each having an interior annular shoulder forming a seat, said seat being adapted to accommodate a packing, a yielding wiper carried by said seat and surrounding said stem, a packing within said sections and resting on said wiper, a gland extending into the sections and surrounding said stem, an elastic washer interposed between said gland and packing, means for securing said gland on to said sections whereby the packing is compressed, webs on said sections having openings, bolts extending through said openings and adapted to secure the sections together, and a yoke arranged to prevent said bolts from working loose.

2. A guide for a stamp-mill stem comprising separable sections each having an interior annular shoulder, said separable sections adapted to be fastened together, and to the supports for same, a plastic packing, yielding means resting on said shoulders and supporting said packing, a cylindrical gland extending in the bore of said sections, and means for securing said gland to said sections.

3. A guide for a stem of stamp-mill comprising separable semicylindrical sections, said sections having means within its bore for the support of a plastic packing, a resilient seat for said packing resting on said means within its bore, a gland adapted to surround said stem and to enter the upper portion of the semicylindrical sections, means on said gland for adjustably forcing the plastic packing to the stem, webs provided on said semicylindrical sections having openings, and bolts extending through said openings and so adapted to tighten said sections to each other.

In testimony whereof, I have hereunto set my hand at Los Angeles, California this 10th day of May 1905.

EDWARD H. MOYLE.

In presence of—
   James R. Townsend,
   Julia Townsend.

Copies of this patent may be obtained for five cents each, by addressing the "Commissioner of Patents, Washington, D. C."